United States Patent Office 3,850,928
Patented Nov. 26, 1974

3,850,928
SUBSTITUTED 6-ALKYLAMINO-2-PHENYL-5-PYRIMIDINE CARBOXYLIC ACIDS
Dong H. Kim, Wayne, and Arthur A. Santilli, Havertown, Pa., assignors to American Home Products Corporation, New York, N.Y.
No Drawing. Continuation-in-part of application Ser. No. 142,015, May 10, 1971, now Patent No. 3,775,412, which is a continuation-in-part of application Ser. No. 874,049, Nov. 4, 1969, now Patent No. 3,631,044, dated Dec. 28, 1971. This application Sept. 4, 1973, Ser. No. 394,963
Int. Cl. C07d 51/42
U.S. Cl. 260—256.4 C                    2 Claims

ABSTRACT OF THE DISCLOSURE

The disclosure is directed to compounds having the formula

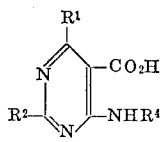

where
$R^1$ is hydrogen or methoxy;
$R^2$ is phenyl, halophenyl, lower alkylphenyl or lower alkoxyphenyl; and
$R^4$ is lower alkyl.

The compounds are intermediates in the preparation of substituted pyrrolo[2,3-d]pyrimidines which have pharmacological activity as central nervous system depressants.

This application is a continuation-in-part of our application Ser. No. 142,015, filed May 10, 1971, now U.S. Pat. 3,775,412, which was in turn a continuation-in-part of our application Ser. No. 874,049, filed Nov. 4, 1969, which issued as Pat. 3,631,044 on Dec. 28, 1971.

This invention relates to new and useful substituted pyrrolo[2,3-d]pyrimidines and to pyrimidinecarboxylic acids which can be made from them and to the process of their preparations. More particularly, this invention relates to 2-aryl-5-oxo-7H-pyrrolo[2,3-d]pyrimidines and to the 4 - methoxy - 2 - aryl - 6 - (lower)alkylamino - 5-pyrimidinecarboxylic acids which may be prepared from them.

The compounds within the purview of the present invention are those having the following formulas:

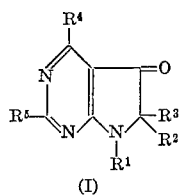
(I)

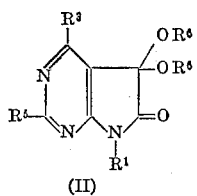
(II)

where
$R^1$ is hydrogen or lower alkyl;
$R^2$ is nitrile or methoxycarboximido;
$R^3$ is chloro or lower alkoxy;
$R^4$ is hydrogen or methoxy, with the proviso that $R^4$ is methoxy when $R^2$ is methoxycarboximido;
$R^5$ is phenyl, halophenyl, lower alkylphenyl and lower alkoxyphenyl; and
$R^6$ is methyl or ethyl.

As used herein, the terms, "lower alkyl," "lower alkoxy," and the like, refer to saturated and unsaturated, branched and straight chain groups having 1 to about 4 carbon atoms.

A typical example of the compounds of this invention which are depicted by structural formula (I) is: 6-chloro-5,6 - dihydro - 7 - methyl - 2 - phenyl - 7H - pyrrolo [2,3-d]pyrimidine-6-carbonitrile.

A typical example of the compounds of this invention which are depicted by structural formula (II) is: 7 - methyl - 2 - phenyl - 5H - pyrrolo[2,3-d]pyrimidine-5,6(7H)dione, 5-dimethyl acetal.

Also contemplated by the present invention are compounds having the following formula which, as is further described below, may be prepared from the above described compounds depicted by structural formula (I):

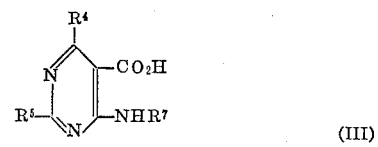
(III)

where $R^4$ and $R^5$ are as defined above; and $R^7$ is lower alkyl.

A typical example of the compounds of this invention which are depicted by structural formula (II) is: 4-methoxy - 6 - methylamino - 2 - phenyl - 5 - pyrimidinecarboxylic acid.

The new and useful compounds of this invention may be prepared by the process which is hereinafter schematically illustrated:

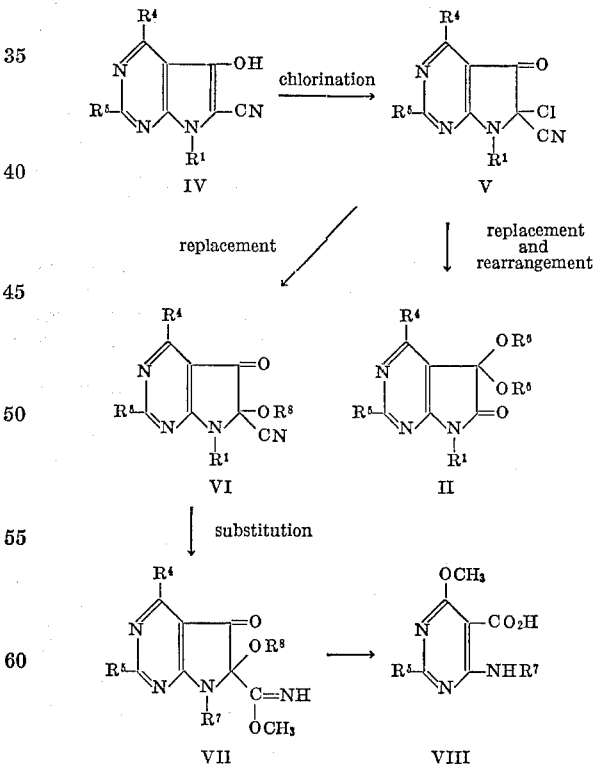

where
$R^1$–$R^7$ are as defined above; and
$R^8$ is lower alkyl.

The 7-(lower)alkyl-2-aryl - 5 - hydroxy - 7H - pyrrolo-[2,3-d]pyrimidine - 6 - carbonitrile starting materials (IV) may be prepared as described in U.S. Pat. 3,575,977, issued Apr. 20, 1971.

As shown in the schematic diagram, a 7-(lower)alkyl-2-aryl - 5 - hydroxy-7H-pyrrolo[2,3-d]pyrimidine-6-carbonitrile (IV) compound is mixed with thionyl chloride and the mixture is heated for about 2 to 5 hours at the reflux temperature, preferably for about 3 hours. When the reaction is complete excess thionyl chloride is removed, for instance under reduced pressure, and the crude product is recrystallized, for instance from chloroform with charcoal treatment to produce a 7 - (lower)alkyl - 2 - aryl-6-chloro-5,6-dihydro - 5 - oxo-7H-pyrrolo[2,3-d]pyrimidine-6-carbonitrile (V).

The 7-(lower)alkyl - 2 - aryl - 6 - chloro-5,6-dihydro-5-oxo-7H-pyrrolo[2,3-d]pyrimidine - 6 - carbonitrile (V) is mixed with an alkanol, and the mixture is heated at reflux temperatures for about ⅙ to 3 hours. Preferably the mixture is heated at reflux temperatures for about 30 minutes. When the reaction is complete, the reaction mixture is concentrated under reduced pressure and chilled causing separation of the product. The product is collected, for instance by filtration, and washed, for instance with alkanol to afford the crude product. The crude product may be recrystallized, for instance from absolute alkanol, to afford a pure product 6-(lower)alkoxy-7-(lower)alkyl-2-aryl-5,6-dihydro - 5 - oxo - 7H-pyrrolo[2,3-d]pyrimidine-6-carbonitrile (VI).

The 6-(lower)alkoxy - 7 - (lower)alkyl - 2 - aryl-5,6-dihydro-5-oxo-7H-pyrrolo[2,3-d]pyrimidine - 6 - carbonitrile (VI is mixed with a solution of an alkali metal in methanol. While other metals may be used, as is known in the art, sodium and potassium are preferred because they will dissolve in the solvents being used and because they produce strong bases. The mixture is stirred at room temperature for about 10 to 120 minutes and then is heated at reflux temperatures for about 10 to 120 minutes. Preferably the reaction mixture is heated at reflux temperature for about ½ hour.

When the reaction is complete the reaction mixture is chilled causing separation of precipitate which may be removed, for instance by filtration. The filtrate is concentrated under reduced pressure and chilled. The precipitate thus separated may be collected, for instance by filtration. The precipitate may be recrystallized, for instance from absolute alkanol, to afford a pure product 4,6-dimethoxy-7-(lower)alkyl-2-aryl - 5,6 - dihydro-5-oxo - 7H - pyrrolo-[2,3-d]pyrimidine-6-carboximidic acid, ester (VII).

The five-membered ring of the 4,6-dimethoxy-7-(lower)alkyl-2-aryl - 5,6 - dihydro - 5 - oxo-7H-pyrrolo[2,3-d]pyrimidine-6-carboximidic acid, ester (VII) may be opened by mixing the compound with a strong base, such as sodium hydroxide, and heating the reaction mixture at reflux temperatures for about ½ to 4 hours. Preferably the reaction mixture is refluxed for about 1½ hours. When the reaction is complete the reaction mixture is filtered to remove any insoluble material. The filtrate is neutralized to a pH of about 4 which causes the separation of a precipitate which may be collected, for instance by filtration. The precipitate may be purified by recrystallization, for instance from absolute alkanol, to afford the product 4-(lower)alkoxy-6-(lower)alkylamino - 2 - aryl - 5 - pyrimidinecarboxylic acid (VIII).

As is shown in the foregoing reaction scheme, an unexpected rearrangement occurs when the 7-(lower)alkyl-2-aryl - 6 - halo - 5,6 - dihydro-5-oxo-7H-pyrrolo[2,3-d]pyrimidine-6-carbonitrile (V) is mixed with an alkanol containing an alkali metal. Methanol is the alkanol used where a desired substituent is methyl; ethanol is used where a desired substituent is ethyl, and so on. While other metals may be used, as is known in the art, sodium and potassium are preferred because they will dissolve in the solvents being used and because they produce strong bases. Addition of guanidine hydrochloride with the reactants has been found to improve the yield. The reaction mixture is stirred at room temperature for about ½ to 4 hours, preferably one hour, and then heated at about 60 to 90° C. for about 5 to 60 minutes. Preferably the reaction mixture is heated at reflux temperature for about 15 minutes. When the reaction is complete, the reaction mixture is concentrated under reduced pressure and chilled. Crystals separate which may be collected, for instance by filtration, and washed, for instance with an alkanol and then with water to afford a crude product. Recrystallization of the crude product from an alkanol, such as methanol, affords the product 7-(lower)alkyl-2-aryl - 5H-pyrrolo[2,3-d]pyrimidine-5,6-(7H)-dione, 5-di-(lower)alkyl acetal (II).

The foregoing products were evaluated for their pharmacological activity and it was found that the 7-(lower)alkyl - 2 - aryl - 6 - halo-5,6-dihydro-5-oxo-7H-pyrrolo[2,3-d]pyrimidine - 6 - carbonitriles (V); 4,6-di-(lower)alkoxy-7-(lower)alkyl - 2 - aryl - 5,6 - dihydro-5-oxo - 7H-pyrrolo[2,3-d]pyrimidine-6-carboximidic acid, esters (VII); and 7-(lower)alkyl-2-aryl-5H-pyrrolo[2,3-d]pyrimidine - 5,6 - (7H)-dione, 5-di(lower)alkyl acetal (II) were active as central nervous system depressants. That is, they produce a calming effect in the host.

The 6 - (lower)alkoxy - 7 - (lower)alkyl-2-aryl-5,6-dihydro - 5 - oxo - 7H-pyrrolo[2,3-d]pyrimidine-6-carbonitriles (VI) are useful in the preparation of 4,6-di-(lower)alkoxy - 7 - (lower)alkyl - 2 - aryl-5,6-dihydro-5 - oxo - 7H-pyrrolo[2,3-d]pyrimidine-6-carboximidic acid, esters (VII). Also some of the compounds (VI) have pharmacological activity as central nervous system depressants, that is, they produce a calming effect in the host.

In the pharmacological evaluation of the biological activity of the compounds of this invention, the *in vivo* effects are tested as follows. The compound is administered orally or intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration(, autonomic activity (i.e., miosis, mydriasis, diarrhea) are noted.

The compounds of this invention induce central nervous system depressant effects at a dose of 127 to 400 milligrams per kilogram of host body weight (MPK) as evidenced by decreased motor activity and decreased respiration.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples, all temperatures are stated in degrees centigrade, and the following abbreviations are used: "g." for grams, "ml." for milliliters, "min." for for minutes, and "hr." for hours.

EXAMPLE I

The following example illustrates the preparation of 6-chloro - 5,6-dihydro-7-methyl-2-phenyl-7$\underline{H}$-pyrrolo[2,3-$d$] pyrimidine - 6 - carbonitrile, a compound of structural formula V.

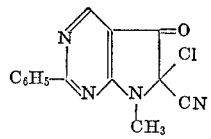

A mixture of 7.0 g. of 5-hydroxy-7-methyl-2-phenyl-7$\underline{H}$-pyrrolo[2,3-$d$]pyrimidine - 6 - carbonitrile and 75 ml. of thionyl chloride was refluxed for 3 hr., then the excess thionyl chloride was removed under reduced pressure. A remaining trace amount of thionyl chloride was removed *in vacuo* to give 6.9 g. of product having a melting point of 175–180°. Recrystallization of the crude product from chloroform with treatment of charcoal afforded a product having a melting point of 183–185°.

Based on the assumed molecular formula $C_{14}H_9ClN_4O$, it was calculated that the elemental analysis by weight would be 59.06 percent carbon, 3.19 percent hydrogen, 19.68 percent nitrogen and 12.46 percent chlorine. The product was analyzed and found to contain 59.27 percent carbon, 3.37 percent hydrogen, 19.47 percent nitrogen and 12.78 percent carbon which confirmed the accuracy of the assumed formula. This may be expressed:

*Analysis.*—Calcd. for $C_{14}H_9ClN_4O$: C, 59.06; H, 3.19; N, 19.68; Cl, 12.46. Found: C, 59.27; H, 3.37; N, 19.47; Cl, 12.78.

When tested in the above-described pharmacological procedure, the product was found to decrease motor activity and decrease respiration at a dose of 127 MPK administered orally.

EXAMPLE II

The following example illustrates the preparation of 7-butyl - 6 - chloro - 5,6-dihydro-5-oxo-2-phenyl-7$\underline{H}$-pyrrolo [2,3-$d$]pyrimidine-6-carbonitrile, a compound of structural formula IV.

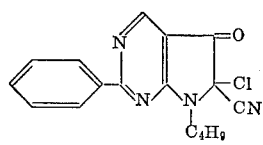

7 - butyl - 6 - chloro-5,6-dihydro-5-oxo-2-phenyl-7$\underline{H}$-pyrrolo[2,3-$d$]pyrimidine - 6-carbonitrile was prepared as in Example I from 1.3 g. of 7-butyl-5-hydroxy-2-phenyl-7$\underline{H}$-pyrrolo[2,3-$d$]pyrimidine-6-carbonitrile and 15 ml. of thionyl chloride. The product was first recrystallized from anhydrous ether, then from heptane to give 0.7 g. of pure compound having a melting point of 125–128°.

*Analysis.*—Calcd. for $C_{17}H_{15}ClN_4O$: C, 62.48; H, 4.62; N, 17.15; Cl, 10.85. Found: C, 62.47; H, 4.71; N, 16.98; Cl, 10.63.

When tested in the foregoing pharmacological procedure, the product was found to decrease motor activity and decrease respiration at a dose of 127 MPK administered orally.

Following the procedure of Example II but substituting appropriate starting materials, compounds having the following substituents may be obtained:

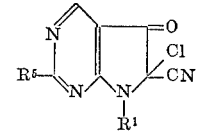

| Example | R$^1$ | R$^5$ |
|---|---|---|
| I | CH$_3$— | C$_6$H$_5$— |
| II | C$_4$H$_9$— | C$_6$H$_5$— |
| II-1 | C$_2$H$_5$— | $p$-ClC$_6$H$_4$— |
| II-2 | C$_3$H$_7$— | $m$-BrC$_6$H$_4$— |
| II-3 | CH$_3$— | $p$-IC$_6$H$_4$— |
| II-4 | C$_2$H$_5$— | $o$-FC$_6$H$_4$— |
| II-5 | H— | $p$-CH$_3$C$_6$H$_4$— |
| II-6 | C$_4$H$_9$— | $p$-C$_2$H$_5$C$_6$H$_4$— |
| II-7 | CH$_3$ | $p$-C$_3$H$_7$C$_6$H$_4$— |
| II-8 | C$_2$H$_5$— | $p$-C$_4$H$_9$C$_6$H$_4$— |
| II-9 | C$_3$H$_7$— | $p$-CH$_3$OC$_6$H$_4$— |
| II-10 | C$_4$H$_9$— | $p$-C$_2$H$_5$OC$_6$H$_4$— |
| II-11 | H— | $p$-C$_3$H$_7$OC$_6$H$_4$— |
| II-12 | CH$_3$— | $p$-C$_4$H$_9$O—C$_6$H$_4$— |

EXAMPLE III

The following example illustrates the preparation of 5,6 - dihydro - 6 - methoxy - 7 - methyl - 5 - oxo-2-phenyl-7$\underline{H}$-pyrrolo[2,3 - $d$]pyrimidine - 6 - carbonitrile, a compound of structural formula VI.

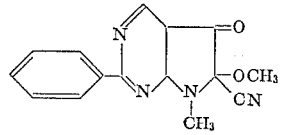

A mixture of 1.6 g. of 6-chloro-5,6-dihydro-7-methyl-2-phenyl-7$\underline{H}$-pyrrolo[2,3-$d$]pyrimidine - 6 - carbonitrile and 55 ml. of absolute methanol was refluxed for 30 min., then concenerated to about 10 ml. under reduced pressure. Chilling of the concentrated solution caused separation of product which was collected on a filter and washed with methanol to give 1.6 g. of product having a melting point of 166–169°. Recrystallization from absolute methanol increased the melting point to 169–171°.

*Analysis.*—Calcd. for $C_{15}H_{12}N_4O_2$: C, 64.27; H, 4.32; N, 19.99. Found: C, 64,39; H, 4.13; N, 20.31.

When evaluated in the above-described pharmacological procedure, the product was found to induce decreased motor activity and decreased respiration at a dose of 127 MPK administered parenterally.

EXAMPLE IV

The following example illustrates the preparation of 6 - ethoxy - 5,6 - dihydro - 7 - methyl - 5 - oxo - 2 - phenyl-7$\underline{H}$-pyrrolo[2,3-$d$]pyrimidine-6-carbonitrile, a compound of structural formula VI.

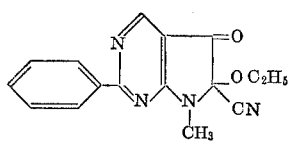

A mixture of 2.5 g. of 6-chloro-5,6-dihydro-7-methyl-2-phenyl-7$\underline{H}$-pyrrolo[2,3-$d$]pyrimidine - 6 - carbonitrile, 45 ml. of absolute ethanol, and 0.5 g. of sodium carbonate was refluxed for 1 hr., and filtered while hot. Chilling of the filtrate caused separation of a precipitate which was collected on a filter. Recrystallization of the crude product from absolute ethanol afforded an analytical sample having a melting point of 150–152°.

*Analysis.*—Calcd. for $C_{16}H_{14}N_4O_2$: C, 65.29; H, 4.80; N, 19.04. Found: C, 65.65; H, 5.17; N, 18.78.

EXAMPLE V

The following example illustrates the preparation of 5,6 - dihydro - 6 - isopropoxy - 7 - methyl - 5 - oxo - 2 - pheny-7H-pyrrolo[2,3-d]pyrimidine-6-carbonitrile, a compound of structural formula VI.

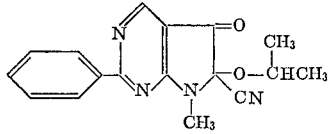

5,6 - dihydro - 6 - isopropoxy - 7 - methyl - 5 - oxo - 2 - phenyl-7H-pyrrolo[2,3-d]pyrimidine - 6 - carbonitrile was prepared by the procedure of Example IV from 4.8 g. of 6-chloro-5,6-dihydro-7-methyl-2 - phenyl - 7H - pyrrolo [2,3-d]pyrimidine-6-carbonitrile and 150 ml. of isopropanol to give 4.5 g. of crude product having a melting point of 131–133°. Recrystallization from absolute ethanol afforded the product.

*Analysis.*—Calcd. for $C_{17}H_{16}N_4O_2$: C, 66.22; H, 5.23; N, 18.17. Found: C, 66.28; H, 4.93; N, 18.53.

Following the procedure of Example III but substituting appropriate starting materials, compounds having the following substituents may be obtained:

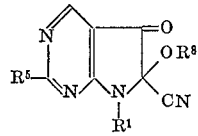

| Example | $R^1$ | $R^5$ | $R^8$ |
|---|---|---|---|
| III | CH₃— | C₆H₅— | CH₃ |
| IV | CH₃— | C₆H₅— | C₂H₅— |
| V | CH₃— | C₆H₅— | i-C₃H₇— |
| V-1 | C₂H₅— | p-ClC₆H₄— | n-C₄H₉— |
| V-2 | C₃H₇— | m-BrC₆H₄— | CH₃— |
| V-3 | CH₃— | p-IC₆H₄— | C₂H₅— |
| V-4 | C₂H₅— | o-FC₆H₄— | i-C₃H₇— |
| V-5 | C₃H₇— | p-CH₃C₆H₄— | C₃H₇— |
| V-6 | C₄H₉— | p-C₂H₅C₆H₄— | C₂H₅— |
| V-7 | CH₃— | m-C₃H₇C₆H₄— | n-C₄H₉— |
| V-8 | C₂H₅— | m-C₄H₉C₆H₄— | C₃H₇— |
| V-9 | C₃H₇— | p-CH₃OC₆H₄— | C₂H₅— |
| V-10 | C₄H₉— | o-C₂H₅OC₆H₄— | C₂H₅— |
| V-11 | CH₃— | m-C₃H₇OC₆H₄— | CH₃— |
| V-12 | CH₃— | p-C₄H₉O—C₆H₄ | CH₃— |

EXAMPLE VI

The following example illustrates the preparation of 5,6-dihydro - 4,6 - dimethoxy - 7 - methyl-5-oxo-2-phenyl-7H-pyrrolo[2,3-d]pyrimidine-6-carboximidic acid, methyl ester, a compound of structural formula VII.

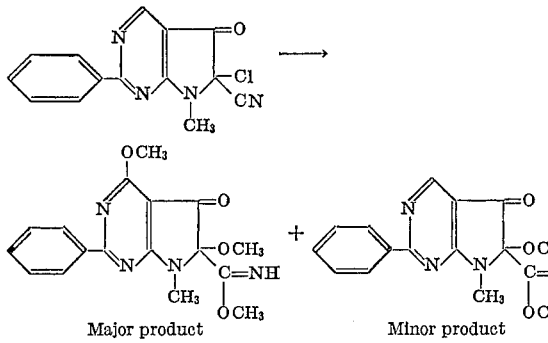

Major product  Minor product (A) To 70 ml. of absolute methanol containing 0.46 g. of sodium was added 5.6 g. of 5,6-dihydro-6-methoxy-7-methyl-5-oxo-2-phenyl - 7H - pyrrolo[2,3-d]pyrimidine-6-carbonitrile. The resulting mixture was stirred at room temperature for ½ hr., then heated to reflux for ½ hr. Chilling of the reaction mixture caused separation of a precipitate which was removed by filtration. The filtrate was concentrated under reduced pressure, and chilled. A precipitate thus separated was collected on a filter to give 1.4 g. of crystals having a melting point of 175–178°. Recrystallization from absolute methanol increased the melting point to 177–179°.

For the product the wave lengths of maximum absorption in infrared illumination when determined as a potassium bromide pellet were found to be 3.07 microns (µ) indicating the presence of an NH group, at 5.82µ indicating the presence of a C=O group and at 5.99µ indicating the presence of a C=NH group. This may be expressed:

$\lambda_{max.}^{KBr.}$ (µ); 3.07 (NH), 5.82 (CO) and 5.99 (CNH).

The nuclear magnetic resonance (NMR) spectrum of the compound indicates three protons at 3.07δ, three protons at 3.30δ, three protons at 3.73δ, three protons at 4.23δ, three protons at 7.55δ, and three protons at 8.60δ. This may be expressed: NMR (δ) CDCl₃: 3.07 (s, 3H), 3.30 (s, 3H), 3.73 (s, 3H), 4.23 (s, 3H), 7.55 (m, 3H) and 8.60 (m, 3H).

In the mass spectrometer the ratios of mass to charge (m/e values) were found to be 342, 284, and 270. This may be expressed: Mass. spec. (m/e) 342, 284, 270.

*Analysis.*—Calcd. for $C_{17}H_{18}N_4O_4$: C, 59.64; H, 5.30; N, 16.37. Found: C, 59.34; H, 5.45; N, 16.30.

When the product was evaluated in the above-described pharmacological procedure, it was found to induce decreased respiration and decreased motor activity at a dose of 127 MPK administered parenterally.

(B) As a minor product there was found 5,6-dihydro-6-methoxy - 7 - methyl - 5 - oxo - 2 - phenyl-7H-pyrrolo-[2,3-d]pyrimidine-6-carboximidic acid, methyl ester.

The precipitatee (1.35 g.) which was isolated by chilling was analyzed and found to be 4-methylamino-2-phenyl-5-pyrimidine-carboxylic acid, methyl ester, having a melting point of 148–150°.

Following the procedure of Example VI but substituting appropriate starting materials, compounds having the following substituents may be obtained:

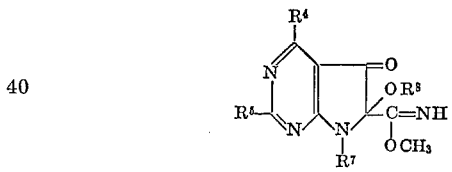

| Example | $R^4$ | $R^5$ | $R^7$ | $R^8$ |
|---|---|---|---|---|
| VIA | CH₃O— | C₆H₅— | CH₃— | CH₃— |
| VIB | H | C₆H₅— | CH₃— | CH₃— |
| VI-1 | CH₃O— | C₆H₅— | CH₃— | C₂H₅— |
| VI-2 | CH₃O | C₆H₅— | CH₃— | i-C₃H₇— |
| VI-3 | CH₃O— | p-ClC₆H₄— | C₂H₅— | C₄H₉— |
| VI-4 | CH₃O— | m-BrC₆H₄— | C₃H₇— | CH₃— |
| VI-5 | H | p-IC₆H₄— | CH₃— | C₂H₅— |
| VI-6 | CH₃O— | o-FC₆H₄ | C₂H₅— | C₄H₉— |
| VI-7 | CH₃O— | o-CH₃C₆H₄— | C₃H₇— | C₃H₇— |
| VI-8 | CH₃O— | p-C₂H₅C₆H₄— | C₄H₉— | C₂H₅— |
| VI-9 | CH₃O— | m-C₃H₇C₆H₄— | CH₃— | C₄H₉— |
| VI-10 | CH₃O— | p-C₄H₉C₆H₄— | C₂H₅— | C₃H₇— |
| VI-11 | H | m-CH₃OC₆H₄— | C₃H₇— | C₂H₅— |
| VI-12 | CH₃O— | o-C₂H₅OC₆H₄— | C₄H₉— | C₂H₅— |
| VI-13 | CH₃O— | p-C₃H₇OC₆H₄— | CH₃— | CH₃— |
| VI-14 | CH₃O— | p-C₄H₉O—C₆H₄ | CH₃— | CH₃— |

EXAMPLE VII

The following example illustrates the preparation of 4 - methoxy - 6 - (methylamino) - 2 - phenyl - 5 - pyrimidinecarboxylic acid, a compound of structural formula VIII. The product supports the structure of compound of Example VI by proving the presence of methoxy at the 4-position.

A mixture of 5,6-dihydro-4,6-dimethoxy-7-methyl-5-oxo - 2 - phenyl - 7H - pyrrolo[2,3-d]pyrimidine - 6-carboximidic acid, methyl ester (0.2 g.) and 10 percent aqueous sodium hydroxide (10 ml.) was refluxed for 1.5 hr., then filtered to remove any insoluble material. Neutralization of the filtrate to about pH 4 caused separation of a precipitate which was collected on a filter. The product was recrystallized from absolute ethanol and decomposed at 201-203.5°.

A later sample similarly prepared decomposed at 203-205°.

*Analysis.*—Calcd. for $C_{13}H_{13}N_3O_3$: C, 60.22; H, 5.05; N, 16.21. Found: C, 59.89; H, 4.95; N, 16.00.

Following the procedure of Example VII but substituting appropriate starting materials, compounds having the following substituents may be obtained.

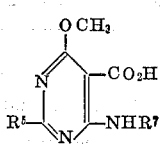

| Example | $R^5$ | $R^7$ |
|---|---|---|
| VII | $C_6H_5$— | $CH_3$ |
| VII-1 | $C_6H_5$— | $C_2H_5$ |
| VII-2 | p-$ClC_6H_4$— | $C_3H_7$ |
| VII-3 | m-$BrC_6H_4$— | $CH_3$ |
| VII-4 | p-$IC_6H_4$— | $C_2H_5$ |
| VII-5 | o-$FC_6H_4$— | $C_3H_7$ |
| VII-6 | o-$CH_3C_6H_4$— | $C_4H_9$ |
| VII-7 | p-$C_2H_5C_6H_4$— | $CH_3$ |
| VII-8 | m-$C_3H_7C_6H_4$— | $C_2H_5$ |
| VII-9 | m-$CH_3OC_6H_4$— | $C_3H_7$ |
| VII-10 | o-$C_2H_5OC_6H_4$— | $C_4H_9$ |
| VII-11 | p-$C_3H_7OC_6H_4$— | $CH_3$ |
| VII-12 | p-$C_4H_9OC_6H_4$— | $CH_3$ |

EXAMPLE VIII

The following example illustrates the preparation of 5,6 - dihydro - 6 - methoxy - 7 - methyl - 5 - oxo - 2-phenyl - 7$\underline{H}$ - pyrrolo[2,3-d]pyrimidine-6-carboxylic acid, methyl ester, a compound of formula VII.

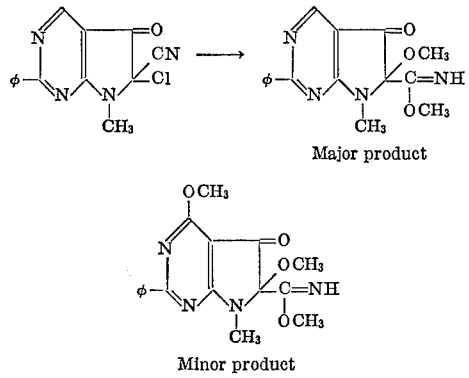

Major product

Minor product

A mixture of 5,6-dihydro-6-methoxy-7-methyl-5-oxo-2-phenyl-7$\underline{H}$-pyrrolo[2,3-d]pyrimidine-6-carbonitrile (2.3 g.), absolute methanol (30 ml.), and a catalytic amount of sodium (0.02 g.) was stirred at room temperature for 3.5 hr., then heated to reflux for 15 min. The reaction mixture was concentrated under reduced pressure and chilled in ice to cause separation of a precipitate which was collected on a filter to give 1.5 g. of 5,6-dihydro-6-methoxy-7 - methyl - 5 - oxo - 2 - phenyl - 7$\underline{H}$ - pyrrolo[2,3-d]pyrimidine-6-carboximidic acid, methyl ester having a melting point of 110-120°. Repeated recrystallization from absolute ethanol raised the melting point to 125-127°.

*Analysis.*—Calcd. for $C_{16}H_{16}N_4O_3$: C, 61.53; H, 5.15; N, 17.94. Found: C, 61.28; H, 5.14; N, 17.85.

Concentration of the mother liquor and subsequent chilling afforded a small amount of 5,6-dihydro-4,6-dimethoxy - 7 - methyl-5-oxo-2-phenyl-7$\underline{H}$ - pyrrolo[2,3-d]-pyrimidine-6-carboximidic acid, methyl ester having a melting point of 177-179°.

EXAMPLE IX

The following example is a proof of the structure of the principal product of Example VIII.

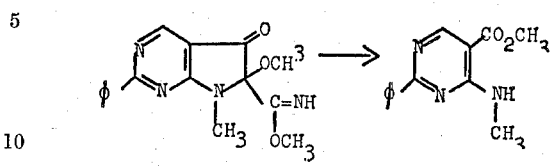

A mixture of 5,6-dihydro-6-methoxy-7-methyl-5-oxo-2-phenyl-7$\underline{H}$-pyrrolo[2,3-d]pyrimidine-6-carboximidic acid, methyl ester (0.29 g.), absolute methanol (7 ml.) and sodium (0.02 g.) was refluxed for 20 min. Chilling of the reaction mixture in ice caused separation of a precipitate which was collected on a filter and recrystallized from methanol to give 0.1 g. of 4-methylamino-2-phenyl-5-pyrimidinecarboxylic acid, methyl ester having a melting point of 148-150°. This compound is identical with an authentic sample prepared by refluxing 5-carbethoxy-2-methylamino-2-phenylpyrimidine with methanol.

*Analysis.*—Calcd. for $C_{13}H_{13}N_3O_2$: C, 64.18; H, 5.39; N, 17.28. Found: C, 64.14; H, 5.24; N, 17.16.

EXAMPLE X

The following illustrates the prepaartion of 7-methyl-2-phenyl-5$\underline{H}$-pyrrolo[2,3-d]pyrimidine-5,6-(7$\underline{H}$) - dione, 5-dimethyl acetal, a compound of structural formula II.

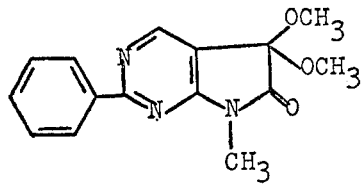

To 50 ml. of anhydrous methanol containing 0.54 g. of sodium methoxide and 1.0 g. of guanidine hydrochloride was added 2.5 g. of 6-chloro-5,6-dihydro-7-methyl-2-phenyl-7$\underline{H}$-pyrrolo[2,3-d]pyrimidine-6-carbonitrile. The resulting mixture was stirred at room temperature for 1 hr., refluxed for 50 min., then concentrated under reduced pressure, and chilled. Crystals were collected on a filter and washed first with ethanol, then with water to give 1.7 g. of product having a melting point of 141-144°. Recrystallization from methanol afforded a product having a melting point of 140-142°.

The same reaction was repeated without guanidine hydrochloride and equivalent results were obtained at lower yields.

*Analysis.*—Calcd. for $C_{15}H_{15}N_3O_3$: C, 63.15; H, 5.30; N, 14.73. Found: C, 63.17; H, 5.21; N, 14.71.

When evaluated in the above-described pharmacological procedure, the product was found to decrease motor activity and decrease respiration at a dose of 400 MPK administered orally.

Following the procedure of Example X but substituting appropriate starting materials, compounds having the following substituents may be obtained:

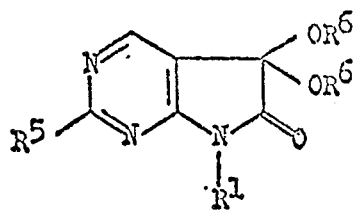

| Example | R¹ | R⁵ | R⁶ |
|---|---|---|---|
| X | CH₃— | C₆H₅— | CH₃— |
| X-1 | CH₃— | C₆H₅— | C₂H₅— |
| X-2 | H | C₆H₅— | CH₃— |
| X-3 | CH₃— | p-ClC₆H₄— | C₂H₅— |
| X-4 | C₃H₇— | m-BrC₆H₄— | CH₃— |
| X-5 | CH₃— | p-IC₆H₄— | C₂H₅— |
| X-6 | C₂H₅— | o-FC₆H₄— | CH₃— |
| X-7 | C₃H₇— | p-CH₃C₆H₄— | CH₃— |
| X-8 | C₄H₉— | p-C₂H₅C₆H₄— | C₂H₅— |
| X-9 | CH₃— | m-C₃H₇C₆H₄— | CH₃— |
| X-10 | C₂H₅— | p-C₄H₉C₆H₄ | C₂H₅— |
| X-11 | C₃H₇— | m-CH₃OC₆H₄ | CH₃— |
| X-12 | C₄H₉— | o-C₂H₅OC₆H₄— | CH₃— |
| X-13 | CH₃— | m-C₃H₇OC₆H₄— | CH₃— |
| X-14 | CH₃— | p-C₄H₉O—C₆H₄ | CH₃— |

What is claimed is:

1. A compound selected from those having the structure:

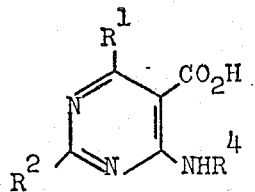

where
R¹ is hydrogen or methoxy;
R² is phenyl, halophenyl, lower alkylphenyl or lower alkoxyphenyl; and
R⁴ is lower alkyl.

2. A compound as defined in Claim 1 which is: 4-methoxy-6-(methylamino)-2-phenyl-5 - pyrimidinecarboxylic acid.

References Cited
UNITED STATES PATENTS

| | | | |
|---|---|---|---|
| 2,789,979 | 4/1957 | Rorig et al. | 260—256.4 C |
| 3,517,010 | 6/1970 | Kim et al. | 260—256.4 N |
| 3,517,011 | 6/1970 | Kim et al. | 260—256.4 N |
| 3,523,119 | 8/1970 | Jutz | 260—256.4 N |

ALTON D. ROLLINS, Primary Examiner

J. H. TURNIPSEED, Assistant Examiner

U.S. Cl. X.R.

260—256.4 F, 256.4 N; 424—251